Patented Dec. 12, 1939

2,183,500

UNITED STATES PATENT OFFICE 2,183,500

FLOTATION OF MATERIALS USED IN METALLURGICAL PROCESSES

Bruce D. Crawford, Grass Valley, Calif., assignor to American Cyanamid Company, a corporation of Maine No Drawing. Application November 17, 1937, Serial No. 174,965

2 Claims. (Cl. 209—166)

This invention relates to methods of purifying waste electric furnace material. More particularly, the invention is directed to the purification of contaminated alumina and cryolite from electric furnaces in the production of aluminum.

In the past, electric furnace waste products which are usually heavily contaminated with carbon have been discarded as no satisfactory method was available for their purification. According to the present invention, I have found that it is possible to float out the carbon by froth flotation leaving a sufficiently pure product for reuse in furnace operations. The invention is particularly economical in the aluminum industry where the furnace by-product losses represent a serious cost, particularly by reason of the large losses of cryolite. By means of flotation it is possible to remove more than 80% of the carbon and other volatile material with less than 11% loss of non-volatiles.

The invention will be described in conjunction with specific examples which illustrate typical embodiments of the present invention in the purification of waste products from electric furnaces producing aluminum.

EXAMPLE 1

A waste product from an aluminum furnace was analyzed as follows:

TABLE 1

| | Per cent |
|---|---|
| Carbon (C) | 40 |
| Alumina ($Al_2O_3$) | 20 |
| Cryolite ($Na_3AlF_6$) | 35 |
| Iron oxide ($Fe_2O_3$) | 0.7 |
| Silica ($SiO_2$) | 0.7 |
| Lime as (CaO) | 1.0 |

On igniting to 1600° F. it showed a total of 51% non-volatile matter and 49% volatiles. A charge of the material was ground to 50.7 minus 200 mesh in the absence of a reagent and was then pulped with water to form a pulp of 22% solids and conditioned for 1 minute with 0.12 lb/ton of kerosene, 0.084 lb/ton of pine oil and 0.24 lb/ton of hardwood creosote. The pulp was then floated in a Fagergren flotation machine. The results appear in the table following Example 2.

EXAMPLE 2

The same material as described in Example 1 was ground finely until it was 61.71% minus 200 mesh. The conditioning and flotation procedures were the same as in Example 1 and the metallurgical results appear in the following table.

TABLE 2

*Metallurgical results*

| Example | Product | Assay | | Distribution | |
|---|---|---|---|---|---|
| | | Volatile | Ash | Volatile | Ash |
| | | Percent | Percent | Percent | Percent |
| 1 | Feed | 46.70 | 53.30 | 100.00 | 100.00 |
| | Conc | 86.40 | 13.60 | 80.80 | 10.95 |
| | Tail | 15.75 | 84.25 | 19.20 | 89.05 |
| 2 | Feed | 46.70 | 53.30 | 100.00 | 100.00 |
| | Conc | 88.00 | 12.00 | 80.30 | 8.70 |
| | Tail | 16.03 | 83.97 | 19.70 | 90.30 |

It will be apparent that a very high recovery was obtained in the flotation tailings which consist chiefly of cryolite and alumina as checked by microscopical examination. Fine grinding increased the recovery slightly and produced a somewhat better grade.

What I claim is:

1. A method of purification of carbonaceous furnace waste from the electric furnace production of aluminum containing as its major constituents carbon, aluminum oxide and cryolite, the carbon and cryolite being present in percentages of the same order of magnitude, which comprises grinding the waste to at least 50% through 200 mesh, forming an aqueous pulp of the finely ground material and subjecting the pulp to froth flotation and removing the froth rich in carbon and poor in cryolite.

2. A method according to claim 1 in which the collector is a pertroleum hydrocarbon.

BRUCE D. CRAWFORD.